United States Patent
Loeven, II

(10) Patent No.: US 8,833,052 B2
(45) Date of Patent: Sep. 16, 2014

(54) SYSTEMS AND METHODS FOR CONTROLLING FUEL MIXING

(75) Inventor: Robert J. Loeven, II, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 640 days.

(21) Appl. No.: 12/627,838

(22) Filed: Nov. 30, 2009

(65) Prior Publication Data

US 2011/0126545 A1 Jun. 2, 2011

(51) Int. Cl.
*F02C 3/20* (2006.01)
*F02C 3/22* (2006.01)

(52) U.S. Cl.
USPC ............ 60/39.463; 60/39.462; 431/5; 431/12

(58) Field of Classification Search
USPC ............... 60/39.461, 39.463, 39.464, 39.465, 60/39.281, 776, 780; 431/12, 5
See application file for complete search history.

(56) References Cited

U.S. PATENT DOCUMENTS

| | | | | |
|---|---|---|---|---|
| 3,762,428 | A * | 10/1973 | Beck et al. ........................ | 137/88 |
| 4,576,570 | A | 3/1986 | Adams et al. | |
| 6,408,611 | B1 * | 6/2002 | Keller et al. .................... | 60/773 |
| 6,640,548 | B2 * | 11/2003 | Brushwood et al. ............ | 60/776 |
| 7,334,391 | B2 | 2/2008 | Sako et al. | |
| 7,396,228 | B2 | 7/2008 | Tanabe et al. | |
| 7,730,726 | B2 | 6/2010 | Asti et al. | |
| 7,931,466 | B2 * | 4/2011 | McFatter, II ..................... | 431/5 |
| 2003/0131604 | A1 | 7/2003 | Scott | |
| 2004/0079087 | A1 * | 4/2004 | Chandran et al. ................ | 60/781 |
| 2006/0248894 | A1 | 11/2006 | Hiramoto et al. | |
| 2007/0254196 | A1 * | 11/2007 | Richards et al. ................. | 429/22 |

FOREIGN PATENT DOCUMENTS

| | | | | |
|---|---|---|---|---|
| CN | 1788146 A | 6/2006 | | |
| CN | 1828029 A | 9/2006 | | |
| CN | 101311630 A | 11/2008 | | |
| JP | S55-121320 | 9/1980 | | |
| JP | S57-035217 | * 2/1982 | ................ | F23N 5/00 |
| WO | 2006070442 | 6/2006 | | |
| WO | 2006059749 | 8/2006 | | |

OTHER PUBLICATIONS

Unofficial English translation of CN Office Action dated Jan. 21, 2014, issued in connection with corresponding CN Application No. 201010587130.1.

European Search Report for European Application No. 10191494.3-1610 mailed Apr. 17, 2014.

* cited by examiner

*Primary Examiner* — Andrew Nguyen
(74) *Attorney, Agent, or Firm* — Sutherland Asbill & Brennan LLP

(57) ABSTRACT

Systems and methods for controlling fuel mixing are provided. One or more parameters associated with the operation of a machine configured to receive a combined fuel may be identified. A fuel flow of the combined fuel that is provided to the machine may be determined. Based at least in part on the identified parameters, a ratio of a first fuel type included in the combined fuel to the determined fuel flow may be determined. The first fuel type may have a heating value that is greater than a second fuel type included in the combined fuel. A flow of the first fuel type may be set based at least in part on the ratio. Subsequent to setting the flow of the first fuel type, an energy content of the fuel flow of the combined fuel may be determined, and the flow of the first fuel type may be adjusted based at least in part on the determined energy content.

18 Claims, 2 Drawing Sheets

SYSTEMS AND METHODS FOR CONTROLLING FUEL MIXING

FIELD OF THE INVENTION

Embodiments of the invention relate generally to fuel-powered machines, and more specifically to systems and methods for controlling the mixing of fuel that is provided to a machine.

BACKGROUND OF THE INVENTION

Certain machines, such as gas turbines, power generating devices, etc., utilize fuel to power their operations. For example, a gas turbine may combust a fuel, such as natural gas, in order to rotate a turbine section and produce work. In certain industrial environments, one or more byproducts or discharges of other processes and/or systems may be utilized as fuel sources to power a turbine or other machine. These various fuel sources may be blended or mixed before they are provided to the machine. For example, in an iron mill, coke oven gas and blast furnace gas may be mixed in order to form a combined fuel source that is utilized to power a gas turbine.

In conventional systems, a first fuel with a relatively high heating value is typically added into a second fuel with a lower heating value, and the combined fuel is provided to a machine. For example, coke oven gas is typically added into blast furnace gas, and the combined gas is provided to a gas turbine. However, the conventional systems often mix the gases in a set ratio or provide relatively limited functionality for adjusting the mixture of the gases. Accordingly, during changes in the operating condition of the gas turbine, such as transient events and/or load changes, the combined gas may not satisfy the power requirements of the gas turbine even if a flow of the combined gas is increased. Additionally, a set ratio may utilize a greater quantity of a high heating value gas than is necessary for suitable operation of the turbine, thereby leading to higher fuel cost.

Accordingly, a need exists for improved systems and methods for controlling fuel mixing.

BRIEF DESCRIPTION OF THE INVENTION

Some or all of the above needs and/or problems may be addressed by certain embodiments of the invention. Embodiments of the invention may include systems and methods for controlling the mixing of a fuel that is provided to a machine. According to one embodiment of the invention, there is disclosed a method for controlling fuel mixing. One or more parameters associated with the operation of a machine that is configured to receive a combined fuel may be identified. The combined fuel may include a plurality of fuel types. A fuel flow of the combined fuel that is provided to the machine may be determined. Based at least in part on the identified one or more parameters, a ratio of a first fuel type of the plurality of fuel types to the fuel flow of the combined fuel may be determined. The first fuel type may have a heating value that is greater than a second fuel type of the plurality of fuel types. A flow of the first fuel type may be set based at least in part on the determined ratio. Subsequent to setting the flow of the first fuel type, an energy content of the fuel flow of the combined fuel may be determined, and the flow of the first fuel type may be adjusted based at least in part on the determined energy content. In certain embodiments, the method may be a computer-implemented method performed by one or more computers associated with a machine controller.

According to another embodiment of the invention, there is disclosed a system for controlling fuel mixing. The system may include at least one sensor, at least one memory, and at least one processor. The at least one sensor may be operable to measure a fuel flow of a combined fuel that is provided to a machine and includes a plurality of fuel types. The at least one memory may be operable to store computer-executable instructions. The at least one processor may be configured to access the at least one memory and execute the computer-executable instructions to: identify one or more parameters associated with the operation of the machine; receive information associated with the measured fuel flow from the at least one sensor; determine, based at least in part on the identified one or more parameters, a ratio of a first fuel type of the plurality of fuel types to the measured fuel flow, wherein the first fuel type has a heating value that is greater than a second fuel type of the plurality of fuel types; set a flow of the first fuel type based at least in part on the determined ratio; receive measurements data associated with an energy content of the fuel flow of the combined fuel subsequent to the flow of the first fuel type being set; and adjust the flow of the first fuel type based at least in part on the received measurements data.

Additional systems, methods, apparatus, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Figure 1:
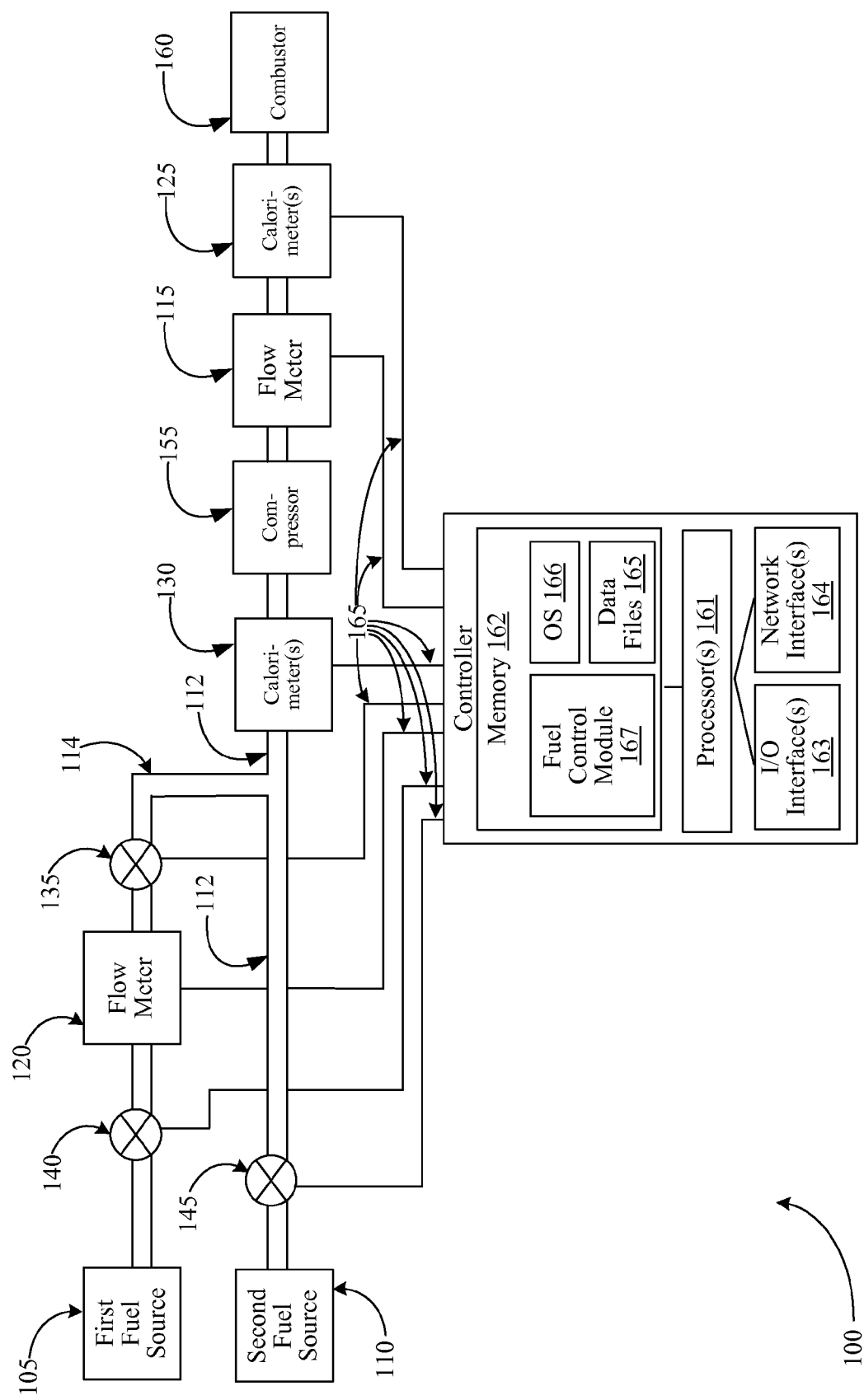

Having thus described the invention in general terms, reference will now be made to the accompanying drawings, which are not necessarily drawn to scale, and wherein:

FIG. 1 is a schematic diagram of one example system for controlling fuel mixing, according to an illustrative embodiment of the invention.

Figure 2:
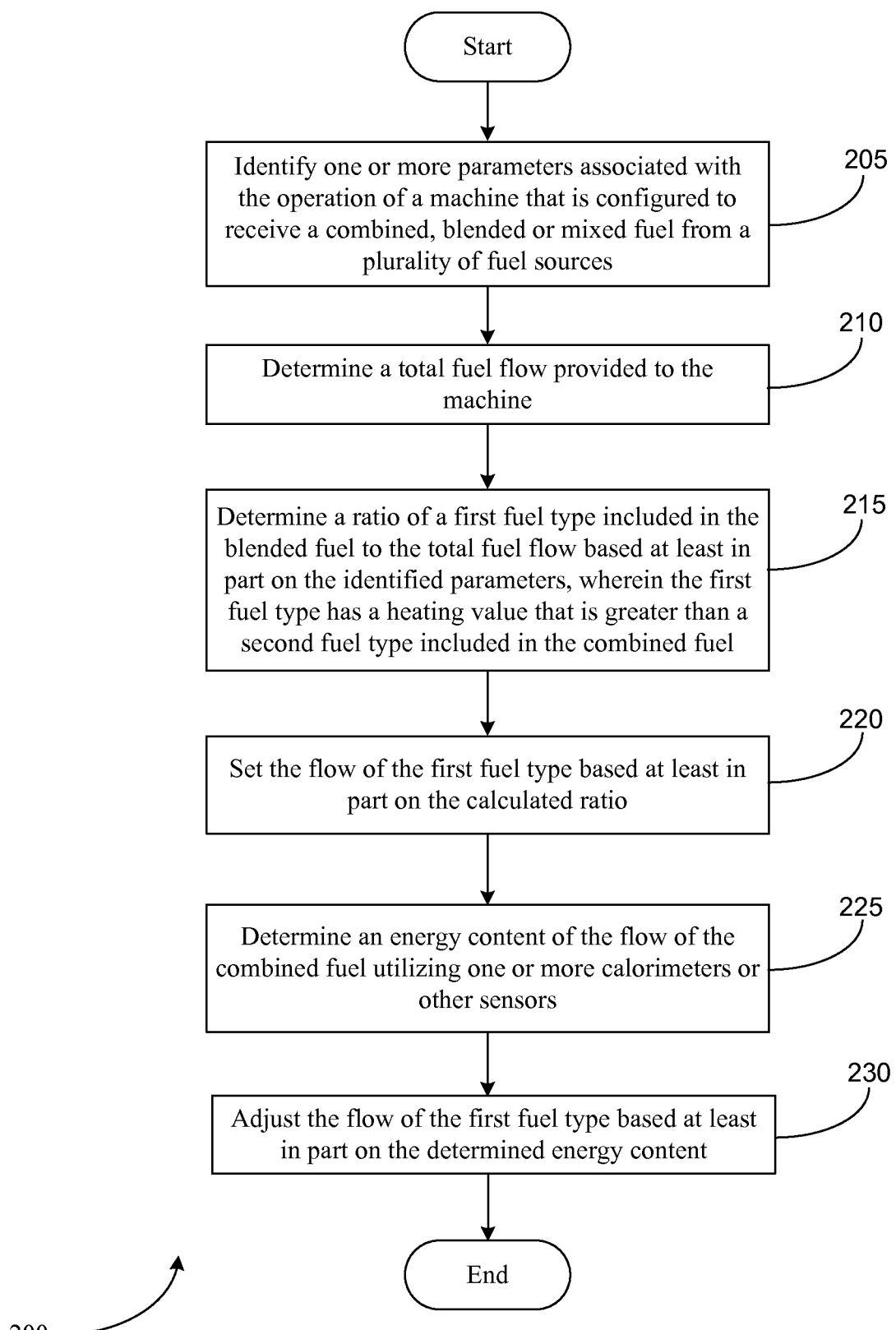

FIG. 2 is a flow diagram of one example method for controlling fuel mixing, according to an illustrative embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

For purposes of this disclosure, the term "machine" may refer to any suitable device, system, method, and/or combination of devices and/or systems and/or methods that utilize fuel to operate. In certain embodiments, a machine may utilize multiple sources and/or types of fuel. Examples of machines include, but are not limited to, gas turbines, power generating devices, rotating machines, reciprocating engines, steam boilers, etc.

Disclosed are systems and methods for controlling the mixing of a fuel that is provided to a machine, such as a gas turbine. One or more parameters associated with the operation of a machine that is configured to receive a combined fuel may be identified. For example, operating parameters, such as a load, of a gas turbine may be identified or determined. The combined fuel may include a plurality of fuel types. A fuel flow of the combined fuel that is provided to the machine may be determined. Based at least in part on the identified one or more parameters, a ratio of a first fuel type of the plurality of fuel types to the fuel flow of the combined fuel may be determined. The first fuel type may have a heating value that is greater than a second fuel type of the plurality of fuel types. A flow of the first fuel type may be set based at least in part on the calculated ratio. Subsequent to setting the flow of the first fuel type, an energy content of the fuel flow of the combined fuel may be determined, and the flow of the first fuel type may be adjusted based at least in part on the determined energy content. In certain embodiments, the method may be a computer-implemented method performed by one or more computers associated with a machine controller.

Various embodiments of the invention may include one or more special purpose computers, systems, and/or particular machines that facilitate the controlling of fuel mixing. A special purpose computer or particular machine may include a wide variety of different software modules as desired in various embodiments. As explained in greater detail below, in certain embodiments, these various software components may be utilized to dynamically control the mixing of a combined fuel that is provided to a machine, such as a gas turbine or other power generating device.

Certain embodiments of the invention described herein may have the technical effect of controlling the mixing of a combined fuel that is provided to a machine. Certain embodiments of the invention may further have the technical effect of dynamically adjusting a mixture of the combined fuel. For example, the mixing of two fuel sources, such as coke oven gas and blast furnace gas, may be controlled in accordance with an example embodiment of the invention.

FIG. 1 is a block diagram of one example system 100 for controlling fuel mixing, according to an illustrative embodiment of the invention. The system 100 illustrated in FIG. 1 may include one or more fuel sources 105, 110, one or more flow meters 115, 120, one or more heat content or Calorie measurement devices (calorimeters) 125, 130, one or more valves 135, 140, 145, and a controller 150.

Certain embodiments of the invention may be utilized to control the mixing or blending of fuel sources, such as gases, in order to provide a combined fuel to a machine, such as a gas turbine. Example environments in which embodiments of the invention may be utilized are an iron mill, a steel mill, or other suitable industrial site that produces quantities of hydrocarbon gases. For example, an iron mill may be equipped with a coke oven and a blast furnace or smelting furnace. The coke oven may produce coke from coal, and a coke oven gas (COG) may be generated in the coke oven during this production. The COG may include various components, such as hydrogen, carbon monoxide, methane, nitrogen, and/or carbon dioxide. Additionally, the COG may be a gas that includes a relatively high lower heating value and/or energy content. The blast furnace may be a furnace that is utilized to produce pig iron, and blast furnace gas (BFG) may be produced during this process. The BFG may also include a variety of components, such as carbon monoxide, hydrogen, carbon dioxide, and/or nitrogen. Additionally, the BFG may have a lower heating value that is lower than that of the COG. The COG, BFG, and/or other gases may be combined or mixed in order to form a combined fuel that is provided to one or more machines, such as a gas turbine. According to an aspect of the invention, the COG may be added to the BFG based at least in part on the energy consumption requirements of the gas turbine. In this regard, the COG, which is typically more valuable than the BFG, may be conserved.

According to an aspect of the invention, any number of fuel sources, such as fuel sources 105, 110 may be provided. A plurality of different types of fuel may be provided from the fuel sources for delivery to a machine or machine component. For example, fuel may be provided from the fuel sources 105, 110 to a combustor 160 of a gas turbine. Each fuel source may be any suitable fuel source or supply of fuel, for example, a fuel tank, a piping line, a fuel line, etc. Additionally, each fuel source 105, 110 may be operable to provide a separate type of fuel; however, a single type of fuel may be provided by multiple fuel sources as desired in various embodiments. Utilizing the example of a gas turbine, a first fuel source 105 may be a source of gas with a relatively high lower heating value or energy content, such as coke oven gas (COG), hydrogen, natural gas, etc. The second fuel source 110 may be a source of gas with a lower heating value that is less than that of the first fuel source 105, such as, blast furance gas (BFG) or Linz-Donawitz (LD) gas. Although a gas turbine is utilized as an example of a machine, various embodiments of the invention may equally be applicable to other types of machines, for example, other power generating devices, rotating machines, reciprocating engines, steam boilers, etc.

With continued reference to FIG. 1, any number of fuel lines, fuel supply lines, and/or fuel pipes may be utilized to supply or provide fuel from the fuel sources 105, 110 to the machine or to one or more components of a machine, such as a combustor 160 of a gas turbine. Each fuel line may include any suitable devices, apparatus, systems, and/or methods that facilitate the provision of fuel to a machine or machine component. For example, the fuel lines may include pipes and/or other suitable flow chambers that are configured to provide fuel from a fuel source to a machine or machine component. Additionally, any number of control valves or other suitable flow control devices may be utilized to control the flow of fuel through the fuel lines. As shown in FIG. 1, a first fuel line 112 and a second fuel line 114 may be provided. The first fuel line 112 may provide fuel from the second fuel source 110 (e.g., BFG) to a machine component, such as the combustor 160. The second fuel line 114 may provide fuel from the first fuel source 105 (e.g., COG) to the first fuel line 112. In this regard, the first fuel and the second fuel may be combined, mixed, or blended to form a combined fuel that may be provided to the machine component. According to an aspect of the invention, the fuel from the first fuel source 105 may be stored or transported at a higher pressure than the fuel from the second fuel source 110. In this regard, the relatively higher energy content fuel from the first fuel source 105 may be added to the lower energy content fuel from the second fuel source 110. For example, COG may be maintained at approximately seventeen (17) pounds per square inch (psi) (117 kPa), and BFG may be maintained at approximately fifteen (15) psi (103 kPa).

With continued reference to FIG. 1, one or more valves may be associated with each fuel line. For example, a first stop valve 145 may be associated with the first fuel line 112. Additionally, a second stop valve 140 and a flow control valve 135 may be associated with the second fuel line 114. The first stop valve 145 and the second stop valve 140 may be suitable valves or other mechanisms that facilitate the control of gas from the fuel sources 105, 110 into the respective fuel lines 112, 114. The stop valves 140, 145, may be selectively opened and/or closed in order to control an amount or supply of fuel that is provided from the fuel sources 105, 110 to the associated fuel lines 112, 114. The flow control valve 135 may be any suitable valve, device, mechanism, system, and/or combination of valves, devices, mechanisms, and/or systems, that facilitates the control of a fuel flow provided by the first fuel source 105 into a fuel flow provided by the second fuel source 110. For example, the flow control valve 135 may facilitate control of a flow of COG into a flow of BFG. In this regard, a relatively high energy fuel flow may be selectively added to and/or combined with a lower energy fuel flow. The flow control valve 135 may be selectively opened, closed, and/or adjusted in order to control an amount or supply of fuel from the first fuel source 105 that is added to the fuel provided by the second fuel source 110. For example, a position of the flow control valve 135 may be adjusted in order to control an amount or flow of COG that is added to a flow of BFG.

As desired in various embodiments of the invention, any number of sensors and/or other suitable measurement devices may be included in the system 100, such as flow meters, calorimeters, gas chromatographs, temperature sensors, pressure sensors, etc. These sensors may be utilized to take various measurements associated with the flow of fuel and/or characteristics of the fuel flow within the system 100. Examples of measurements that may be taken include, but are not limited to, volumetric flow measurements, mass flow measurements, energy-content flow measurements, temperature measurements, pressure measurements, etc. As shown in FIG. 1, one or more flow meters 115, 120 may be provided. The flow meters 115, 120 may be any suitable flow meters or devices that are operable to measure a flow rate of a fuel transported through a fuel line. For example, the flow meters 115, 120 may measure a volumetric flow rate, a mass flow rate, and/or a thermal mass flow rate of a fuel that is transported through a fuel line. A wide variety of different types of flow meters may be utilized as desired in various embodiments of the invention, for example, venture flow meters, ultrasonic flow meters, mechanical flow meters, pressure-based flow meters, optical flow meters, etc. With reference to FIG. 1, a combined fuel flow meter 115 may be operable to measure a flow of the combined fuel after a first fuel type from the first fuel source 105 has been added to a second fuel type from the second fuel source 110. For example, the combined fuel flow meter 115 may be operable to measure a combined flow of COG and BFG. In certain embodiments, the combined fuel flow meter 115 may be a venture flow meter. Similarly, a first fuel type flow meter 120 may be operable to measure a flow of a first fuel type (e.g., COG or another relatively high energy content fuel type) prior to combining the flow of the first fuel type with a flow of the second fuel type. In certain embodiments, the first fuel type flow meter 120 may be an ultrasonic flow meter. As desired, multiple or redundant flow meters may be utilized to measure or determine a particular fuel flow and improve the accuracy of the measurements or determinations.

Additionally, in certain embodiments of the invention, one or more heat capacity sensors and/or measurement devices that are operable to measure the energy content and/or heat capacity of a fuel flow may be provided. For example, one or more calorimeters and/or gas chromatographs may be provided that are operable to measure or determine an energy content and/or heat capacity. A wide variety of different types of calorimeters may be utilized as desired in various embodiments of the invention, such as differential scanning calorimeters, isothermal microcalorimeters, titration calorimeters, and/or accelerated rate calorimeters. As desired, multiple or redundant calorimeters or other devices may be utilized to measure or determine a particular fuel flow and improve the accuracy of the measurements or determinations. As shown in FIG. 1, a first calorimeter 125 or group of calorimeters may be utilized to measure the heat content of the combined fuel flow subsequent to the combined fuel flow being compressed by one or more compressors 155. In this regard, the first calorimeter 125 may account for water drop-out that might occur as a result of compressing the combined fuel flow. Similarly, a second calorimeter 130 or group of calorimeters may be utilized to measure the heat content of the combined fuel flow prior to the combined fuel flow being compressed by one or more compressors 155.

With continued reference to FIG. 1, one or more compressors 155 or compressor sections may optionally be provided in certain embodiments of the invention. A compressor 155 may be operable to increase the pressure of the combined fuel flow or otherwise compress the combined fuel flow. In this regard, water and/or other additives may be removed from the combined fuel flow. For example, with a combined fuel flow that is made up of BFG and COG, water may drop out during the compression of the fuel flow. In this regard, the energy content of the compressed fuel flow may be higher than that of the uncompressed fuel flow. A wide variety of different types of compressors may be utilized as desired in various embodiments of the invention, such as centrifugal compressors, diagonal compressors, axial-flow compressors, reciprocating compressors, rotary vane compressors, scroll compressors, and/or diaphragm compressors. In certain embodiments, the compressor 155 may be a suitable compressor section of a gas turbine or other machine.

In addition to the sensors associated with the system 100, any number of sensors may be associated with the machine as desired in various embodiments of the invention. For example, suitable pressure sensors, temperature sensors, etc. may be associated with a gas turbine or other machine. Additionally, as desired, one or more connections, such as the connections 168 discussed below may facilitate communications between the various sensors and/or measurements devices and the controller 150.

The system 100 may further include at least one controller 150 or suitable control system. The controller 150 may be operable to monitor and/or control the mixing of fuel types to form a combined fuel with desired characteristics that may be provided to a machine or machine component, such as the combustor 160 of a gas turbine. For example, the controller 150 may be operable to determine an amount of a first fuel type that should be added to a second fuel type, such as an amount of COG that should be added to BFG. Additionally, the controller 150 may monitor the combined fuel flow after the mixing of the fuel types and dynamically adjust the amount of the first fuel type that is added to the second fuel type. In doing so, the controller 150 may receive measurements data, calculations, and/or other data from any number of sensors or other components of the system 100 and/or from external components or systems. As desired, the controller 150 may control the operation of the one or more valves 135, 140, 145 in order to control the mixing or blending of the various fuel types. As shown in FIG. 1, a plurality of connections 168 may facilitate communications between the controller 150 and the various valves 135, 140, 145 and/or sensors 115, 120, 125, 130 included in the system 100. A wide variety of different types of suitable connections may be utilized to facilitate communication, for example, direct network connections, local area network connections, wide area network connections, Internet connections, Bluetooth™ enabled connections (trademark owned by BLUETOOTH SIG, INC.), radio frequency network connections, cellular network connections, any suitable wired connections, any suitable wireless connections, and/or any suitable combinations of connections.

With continued reference to FIG. 1, the controller 150 may be a suitable processor driven device that is capable of controlling the mixing or blending of multiple fuel types to create a combined fuel. Examples of suitable controllers include, but are not limited to, application specific circuits, microcontrollers, minicomputers, personal computers, servers, other computing devices and the like. In certain embodiments, the controller 150 may be or may be incorporated into a supervisory command and data acquisition (SCADA) system associated with a turbine, a power source, and/or a power plant. The controller 150 may include any number of processors 161 that facilitate the execution of computer-readable instructions to control the operations of the controller 150. By executing computer-readable instructions associated with controlling the mixing or blending of multiple fuel types, the controller 150 may form a special purpose computer that controls fuel mixing.

In addition to one or more processor(s) 161 the controller 150 may include one or more memory devices 162, one or more input/output (I/O) interfaces 163, and one or more network interfaces 164. The one or more memory devices 162 or memories may be any suitable memory devices for example, caches, read only memory devices, random access memory devices, magnetic storage devices, etc. The one or more memory devices 162 may store data, executable instructions, and/or various program modules utilized by the controller 150, for example, data files 165, an operating system (OS) 166, and/or a flow control module 167 or flow control application. The data files 165 may include stored data associated with the operation of the machine, stored data associated with the fuel sources 105, 110, stored data associated with the fuel types (e.g., COG and BFG for a gas turbine application), stored measurements data received from the various sensors, stored data associated with the operation of the valves 135, 140, 145, and/or data associated with various fuel mixing calculations and/or fuel flow calculations.

In certain embodiments of the invention, the controller 150 may include any number of software applications that are executed to facilitate the operations of the controller 150. The software applications may include computer-readable instructions that are executable by the one or more processors 161. The execution of the computer-readable instructions may form a special purpose computer that facilitates the mixing or blending of a combined fuel. As an example of a software application, the controller 150 may include an operating system (OS) 166 that controls the general operation of the controller 150 and that facilitates the execution of additional software applications. The controller 150 may also include a flow control module 167 that is operable to control and/or adjust the mixing of a combined fuel that may be provided to a machine or machine component. For example, the flow control module 167 may set a flow of the first fuel type based upon one or more parameters or characteristics of the machine, and the flow control module 167 may monitor characteristics of a combined fuel that includes the first fuel type and dynamically adjust the flow of the first fuel type. In this regard, the flow control module 167 may control the mixing of the various fuel types in order to produce a fuel that satisfies or meets the operating requirements of the machine. For example, a combined fuel may be dynamically mixed that satisfies the energy requirements of the machine.

An example of the operations that may be performed by the flow control module 167 is provided below with respect to FIG. 2. Additionally, although the flow control module 167 is illustrated in FIG. 1 as a single component, the operations of the flow control module 167 may be performed by any number of components, applications, and/or software modules as desired in various embodiments of the invention.

The one or more I/O interfaces 163 may facilitate communication between the controller 150 and one or more input/output devices, for example, a universal serial bus port, a serial port, a disk drive, a CD-ROM drive, and/or one or more user interface devices, such as a display, keyboard, keypad, mouse, control panel, touch screen display, microphone, etc. that facilitate user interaction with the controller 150. The one or more I/O interfaces 163 may be utilized to receive or collect data and/or user instructions from a wide variety of input devices. Received data may be processed by the controller 150 as desired in various embodiments of the invention and/or stored in the one or more memory devices 162.

The one or more network interfaces 164 may facilitate connection of the controller 150 to one or more suitable networks and/or connections, for example, the connections 168 that facilitate communications with the valves 135, 140, 145 and/or the various sensors 115, 120, 125, 130 associated with the system 100. In this regard, the controller 150 may receive data from one or more sensors and/or communicate data and/or commands to the valves. The one or more network interfaces 164 may further facilitate connection of the controller 150 to one or more suitable networks, for example, a local area network, a wide area network, the Internet, a cellular network, a radio frequency network, a Bluetooth™ enabled network (trademark owned by BLUETOOTH SIG, INC.), a Wi-Fi™ enabled network (trademark owned by Wi-Fi Alliance Corporation), a satellite-based network, any wired network, any wireless network, etc., for communication with external devices and/or systems.

As desired, embodiments of the invention may include a system 100 with more or less than the components illustrated in FIG. 1. The system 100 of FIG. 1 is provided by way of example only.

FIG. 2 is a flow diagram illustrating one example method 200 for controlling fuel mixing, according to an illustrative embodiment of the invention. The method may be utilized in association with one or more fuel mixing systems, such as the system 100 illustrated in FIG. 1. In other words, the method 200 may be utilized by a suitable fuel control module, such as the fuel control module 167 illustrated in FIG. 1, to dynamically control the mixing of a combined fuel that may be provided to a machine or machine component, such as the combustor of a gas turbine.

The method 200 may begin at block 205. At block 205, one or more parameters associated with the operation of a machine may be identified or determined. The machine may be a machine that is configured to receive a combined, blended, or mixed fuel from a plurality of fuel sources. For example, the machine may be a gas turbine that is configured to receive a combined fuel that is made up of a plurality of different fuel types. One of the fuel types may have a relatively higher lower heating value and/or energy content than another of the fuel types. It may be desirable to control an amount of the higher energy content fuel type in order to conserve that fuel type. As one example, a gas turbine may be configured to receive a combined fuel that is made up of COG that is added to BFG. Any number and/or types of parameters may be identified as desired in various embodiments of the invention. Utilizing the example of a gas turbine, identified parameters may include, but are not limited to, an exit temperature for a combustor section of the gas turbine, a load of the gas turbine, a pressure within the gas turbine, a temperature within the gas turbine, and/or an exhaust temperature of the gas turbine.

At block 210, a total or combined fuel flow that is provided to the machine or that is expected by the machine may be determined or identified. For example, the total fuel flow for a combined fuel that is provided to the machine may be measured by one or more suitable sensors or measurement devices, such as the combined fuel flow meter 115 illustrated in FIG. 1. As another example, an expected fuel flow for the machine may be identified or determined. An expected fuel flow may be determined utilizing a wide variety of parameters, such as operating parameters or operating characteristics of the machine. As desired, an expected fuel flow may be determined utilizing one or more look up tables and/or models. For example, given a load of a gas turbine or exit temperature of a gas turbine combustor, an expected fuel flow to be provided to the gas turbine may be identified or determined.

At block 215, a ratio of the first fuel type (e.g., COG) included in the combined or blended fuel to the total fuel flow may be determined or calculated. For any given fuel flow, a certain percentage of the fuel flow may be comprised of a fuel type that has a relatively high energy content or lower heating value. In this regard, a desired lower heating value or energy content threshold of the total fuel flow may be achieved, and a desired operation of the machine may be maintained. In certain embodiments, the percentage or ratio may be determined based at least in part on the one or more identified parameters associated with the operation of the machine. For example, one or more look up tables and/or models may be utilized that take an operating characteristic into account and determine a ratio or percentage of the first fuel type that should be included in the combined fuel.

Utilizing an example in which COG is mixed into BFG and a combined fuel is provided to a gas turbine, a ratio of COG to the combined fuel may be determined. The ratio may be determined based at least in part on one or more identified operating conditions. For example, a percentage of COG may be lower at a base load operating condition than at a start up operating condition. As another example, a percentage of COG may be lower at a minimum load operating condition than at a maximum load operating condition. The initial determination of a ratio or percentage of COG to total fuel flow may make various assumptions in order to provide a relatively efficient and expedient method for determining an amount of COG to be supplied. For example, it may be assumed that the compositions of the COG and BFG are relatively consistent. Additionally, in certain embodiments, a ratio may include a correction for water dropout if the total fuel or combined fuel is compressed. In other words, it may be assumed that there is a relatively constant percentage of water vapor that may drop out from the combined fuel during compression. An example equation for determining a percentage of total fuel flow that should be COG is set forth in equation one (1) below:

$$m_{COG} = m_{TOT} * \frac{(LHV_{TOT} - LHV_{BFG}) - \left[\frac{m_{H2O}}{(m_{TOT} + m_{H2O})} * LHV_{BFG}\right]}{(LHV_{COG} - LHV_{BFG})} \quad (1)$$

With reference to the equation above, a mass flow of COG may be determined by utilizing the total mass flow of the combined fuel, an expected or estimated mass flow of water included in the fuel, and the lower heating values of COG, BFG, and the combined fuel. As one example of a calculation utilizing Equation 1, a minimum load condition of a gas turbine may require a fuel flow that has an energy content of approximately 1,200 kilocalories (kcal) per Newton meter cubed ($Nm^3$). It may be determined that a desired COG flow for the minimum load condition is approximately 6.8 pounds per second (lb/s). In other words, a percentage of the total fuel flow that should be COG may be determined to be approximately 5.8 %. At a maximum load condition, the required energy content of the fuel flow may be approximately 1,050 $kcal/Nm^3$. The desired COG flow for the maximum load condition may be determined to be approximately 9.0 lb/s or approximately 3.6% of the total fuel flow. The water drop out from the total fuel during compression may be approximately 6.3 lb/s at minimum load and approximately 9.5 lb/s at maximum load. Equation 1 is an example equation that may be utilized in various embodiments of the invention. Other equations may be utilized as desired in other embodiments of the invention to determine an amount of COG to include in a given combined fuel flow.

At block 220, the flow of the first fuel type may be set based at least in part on the determined ratio or percentage. For example, following the determination of a ratio or percentage at block 215, the determined ratio or percentage may be multiplied by the total fuel flow determined at block 210. The result of the multiplication may be utilized to set the flow of the first fuel type. In order to set the flow of the first fuel type, the position of one or more valves that control the flow of the first fuel type, such as the flow control valve 135 shown in FIG. 1, may be manipulated or controlled in order to provide a desired amount of the first fuel type (e.g., COG) to be mixed with the second fuel type (e.g., BFG).

The initial setting of the flow of the first fuel type at block 220 based upon one or more operating conditions may provide a relatively fast and accurate control method that is capable of responding to fast transients in the fuel flow. However, the initial setting of the flow may not account for deviations in the fuel composition or an actual amount of water that is removed from the combined fuel flow. Accordingly, a dynamic trim function may be implemented in order to correct for any deviations in the lower heating value of the combined fuel that is provided to the machine.

Once the fuel flow of the first fuel type has been set at block 220, the flow of the combined fuel may be monitored and dynamically adjusted in order to maintain a desired lower heating value of the combined fuel. For example, at block 225, an energy content of the combined or total fuel may be determined or calculated utilizing one or more suitable sensing devices, such as the one or more calorimeters 125, 130 illustrated in FIG. 1. Based upon the energy content determination at block 225, the flow of the first fuel type may be dynamically adjusted at block 230. The fuel flow of the first fuel type may be continuously monitored and/or adjusted during the operation of the machine. If an operating condition of the machine changes, a new set point for the first fuel type may be determined as set forth above with reference to blocks 205 through 220.

The calorimeters 125, 130 may be positioned either before or after a compressor, such as the compressor 155 illustrated in FIG. 1. Alternatively, calorimeters may be utilized both before and after the compression of the total combined fuel. A calorimeter may measure or determine the energy content of the combined fuel flow. Measurements data received from the calorimeter may be provided to one or more adjustment devices or adjustment components associated with the controller 150, for example, one or more proportional-integral (PI) regulators and/or one or more proportional-integral-derivative (PID) regulators. The adjustment devices may adjust the set point for the fuel flow valve 135 based at least in part on the received measurements data. In other words, the position of the fuel flow valve 135 may be dynamically adjusted. In this regard, any differences between a desired energy content or lower heating value of the actual fuel flow and an expected or desired fuel flow may be reduced or eliminated.

In certain embodiments, there may be a fuel transport and/or sensor delay between the fuel flow valve 135 and the calorimeters. A transport delay may vary with the fuel flow and/or with different compositions of the combined fuel. Additionally, the delay may be greater for a calorimeter 125 that is positioned after a compressor. In order to account for this delay, a lag may be provided in the controller 150 and/or the adjustment devices associated with the controller 150. In certain embodiments, the lag may vary in accordance with operating modes and/or operating conditions associated with the machine. For example, a PI regulator may utilize the output of a calorimeter as feedback, and the lag chosen or set fuel lower heating value as a set point. The output of the PI regulator may be a first fuel flow bias. In certain embodiments, the first fuel flow bias may be between various limits or threshold values, such as limits of plus or minus one-half percent, in order to limit its effect on the final lower heating value. The bias may be added to the previously established first fuel flow set point, and the set point may be adjusted utilizing the bias. In this regard, the flow of the first fuel type may be dynamically adjusted.

The method 200 may end following block 230.

The operations described and shown in the method 200 of FIG. 2 may be carried out or performed in any suitable order as desired in various embodiments of the invention. Additionally, in certain embodiments, at least a portion of the operations may be carried out in parallel. Furthermore, in certain embodiments, less than or more than the operations described in FIG. 2 may be performed.

Embodiments of the invention may accurately mix or blend a combined fuel during changing conditions and/or operating parameters. Additionally, the mixing or blending may be achieved in an expedient manner. The speed of various embodiments of the invention may be much greater than the speed of fuel mixing systems that rely solely on the use of calorimeters because embodiments of the invention may sense and respond to changes in flow and/or transient events in a relatively rapid manner. Even fast calorimeters may have a sensor delay of approximately ten seconds. By utilizing calorimeters as a secondary trim, the effects of calorimeter delay may be reduced. Additionally, the risk associated with drifting calorimeters or calorimeters that may require calibration may be reduced.

Embodiments of the invention may also contribute to the conservation of fuel types that have a relatively high lower heating value (e.g., COG), and therefore, have a higher economic value than fuel types with a lower energy content (e.g., BFG).

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for controlling fuel mixing, the method comprising:
   identifying one or more parameters associated with the operation of a machine, wherein the machine is configured to receive a combined fuel formed by mixing together a plurality of fuel types;
   determining a fuel flow of the combined fuel that is provided to the machine, wherein the fuel flow is determined by a combined fuel flow meter after at least a first fuel type has been added to at least a second fuel type;
   compressing the combined fuel utilizing at least one compressor;
   determining, based at least in part on the identified one or more parameters, a ratio of a flow of the first fuel type to the determined fuel flow, wherein the first fuel type has a heating value that is greater than another fuel type of the plurality of fuel types, and wherein the ratio comprises a correction for water dropout after the combined fuel is compressed;

setting a flow of the first fuel type based at least in part on the determined ratio;

determining an energy content of the fuel flow of the combined fuel subsequent to setting the flow of the first fuel type; and adjusting the flow of the first fuel type based at least in part on the determined energy content, wherein the above are performed by one or more computers associated with a machine controller.

2. The method of claim 1, wherein determining an energy content comprises determining an energy content utilizing at least one calorimeter or at least one gas chromatograph.

3. The method of claim 1, wherein determining an energy content comprises one of (i) determining an energy content prior to the combined fuel being compressed by the at least one compressor, (ii) determining an energy content subsequent to the combined fuel being compressed by the at least one compressor, or (iii) determining an energy content both prior to and subsequent to the combined fuel being compressed by the at least one compressor.

4. The method of claim 1, wherein adjusting the flow of the first fuel type comprises dynamically adjusting the flow of the first fuel type utilizing at least one of a proportional-integral (PI) regulator or a proportional-integral-derivative (PID) regulator.

5. The method of claim 1, wherein the first fuel type comprises one or more of coke oven gas (COG), natural gas, or hydrogen.

6. The method of claim 1, wherein the second fuel type comprises one or more of blast furnace gas (BFG) or Linz Donawitz (LD) gas.

7. The method of claim 1, wherein identifying one or more parameters associated with the operation of the machine comprises identifying at least one of an exit temperature for a combustor associated with the machine, a pressure within the machine, or a load of the machine.

8. The method of claim 1, wherein the combined fuel flow meter comprises at least one of an ultrasonic flow meter or a venturi flow meter.

9. The method of claim 1, wherein setting a flow of the first fuel type comprises setting a position of a valve operable to provide the flow of the first fuel type to the machine.

10. A system for controlling fuel mixing, the system comprising:

at least one sensor operable to measure a fuel flow of a combined fuel that is provided to a machine, wherein the combined fuel is formed by mixing together a plurality of fuel types;

at least one compressor operable to compress the combined fuel;

at least one memory operable to store computer-executable instructions; and at least one processor configured to access the at least one memory and execute the computer-executable instructions to:

identify one or more parameters associated with the operation of the machine;

receive information associated with the measured fuel flow from the at least one sensor, wherein the measured fuel flow is determined after at least a first fuel type has been added to at least a second fuel type;

determine, based at least in part on the identified one or more parameters, a ratio of a flow of the first fuel type to the measured fuel flow, wherein the first fuel type has a heating value that is greater than another fuel type of the plurality of fuel types, and wherein the ratio comprises a correction for water dropout after the combined fuel is compressed;

set a flow of the first fuel type based at least in part on the determined ratio;

receive measurements data associated with an energy content of the fuel flow of the combined fuel subsequent to the flow of the first fuel type being set; and adjust the flow of the first fuel type based at least in part on the received measurements data.

11. The system of claim 10, wherein the at least one processor is operable to receive measurements data associated with an energy content from one of at least one calorimeter or at least one gas chromatograph.

12. The system of claim 10, wherein the at least one processor is operable to receive measurements data associated with an energy content either (i) prior to the compression of the combined fuel by the at least one compressor, (ii) subsequent to the compression of the combined fuel by the at least one compressor, or (iii) both prior to and subsequent to the compression of the combined fuel by the at least one compressor.

13. The system of claim 10, wherein the at least one processor comprises at least one of a proportional-integral (PI) regulator or a proportional-integral-derivative (PID) regulator that is operable to adjust the flow of the first fuel type.

14. The system of claim 10, wherein the first fuel type comprises one or more of coke oven gas (COG), natural gas, or hydrogen.

15. The system of claim 10, wherein the another fuel type comprises one or more of blast furnace gas (BFG) or Linz Donawitz (LD) gas.

16. The system of claim 10, wherein the one or more parameters associated with the operation of the machine comprises at least one of an exit temperature for a combustor associated with the machine, a pressure within the machine, or a load of the machine.

17. The system of claim 10, wherein the at least one sensor comprises at least one of an ultrasonic flow meter or a venturi flow meter.

18. The system of claim 10, further comprising:

at least one valve operable to provide the flow of the first fuel type to the machine, wherein the at least one processor is operable to set a flow of the first fuel type by setting a position of the at least one valve.

* * * * *